Inventor:
Reinhard Schneider
By: Reynolds, Beach & Christensen
Attorneys

Inventor:
Reinhard Schneider

United States Patent Office 3,144,558
Patented Aug. 11, 1964

3,144,558
APPARATUS FOR THE INDICATION AND MEASUREMENT OF NUCLEAR RADIATION
Reinhard Schneider, 2 am Breitenhagen, Altena, Westphalia, Germany
Filed Jan. 19, 1960, Ser. No. 3,464
11 Claims. (Cl. 250—83.6)

This invention relates to a small, easily portable, pocket-sized apparatus for the indication and measurement of nuclear radiation.

This kind of apparatus usually consists of a source of power, which supplies power to a radiation detector and an indicating device.

Up to the present time various versions of apparatus are known which permit measurements and which are more or less limited, in the field of radioactivity measuring. These versions do not satisfy, or satisfy only to a limited extent, the tasks set; for example, when used for civilian air protection or for civil defense, as set down in the directions published by official sources.

Most apparatuses of this kind employ Geiger-Muller counter tubes as detectors. The pulses delivered by these detectors are amplified and made to operate an indicating device. Apparatuses are known in which the counter tube pulses trigger a blocking oscillator, which standardizes and amplifies the pulses. In order to attain a measurement range of 0.05 mr./h. to 50 r./h., these apparatuses generally require two to three counter tubes. Another known apparatus attains by means of a familiar trick circuit a measuring range of 2 mr./h. to 50 r./h. using one counter tube.

All these apparatuses indicate the measurement result on a meter dial, with which one of several simultaneously visible dials is associated with the relevant measuring range, or on the other hand the value indicated on a dial has to be multiplied with a factor relevant to the switch position/measurement range.

With all these apparatuses the indication is not clear, as it cannot be prevented that a layman may read off on the dial (which is generally calibrated for $\gamma$ radiation) a value which in reality represents $\gamma+\beta$ radiation.

A further proposed solution provides for a radioactivity-sensitive crystal for the insensitive ranges (high level of radiation), which crystal is coupled to a photoelectric cell and which works according to the scintillation principle; for the sensitive measuring ranges (low level of radiation) there is provided a counter tube with which the indication is effected by means of an electron tube connected up as an inverted VTVM, in connection with the meter.

A further solution does in fact effect a clear indication in each range, but requires at least two counter tubes for the representation of the necessary measurement range.

Apparatuses are also known which serve warning purposes, dosage measuring purposes, or combined apparatuses of this kind. These known apparatuses differ from the subject of the invention, however, by virtue of their type.

The pocket apparatus according to the invention does not only fulfill the task set according to the rules quoted, in doing which the disadvantages of the known apparatuses no longer apply; but in addition to this an apparatus covered by the invention can be produced especially economically and can be manufactured and aligned with a high degree of accuracy. In this way, the apparatus of the invention can be produced more cheaply than apparatuses which only afford a part solution.

This is achieved by means of an arrangement according to the invention for the indication or the measurement, especially of nuclear radiation, which arrangement possesses detectors delivering pulses, the power supply of which detectors is effected by means of an HT oscillators; this arrangement also possesses an electronic circuit and further mechanical means, switches and indication meters which in accordance with the invention act together in such a manner that, in the ranges in which the detectors deliver low pulse counts, the individual pulses are standardized and shaped by extending their length and then integrated with a correspondingly large time constant, during which by means of further measures the consumption of the HT oscillator supplying power to the detector is simultaneously reduced to the minimum necessary in each case; whereas in the ranges with a high pulse count the pulse shaping on the time axis as well as the integration time constant are reduced expediently and according to the measurement task but the HT oscillator consumption, corresponding to the higher consumption, is increased, with which in addition a separate indicator dial is allotted by mechanical means to each measurement range, which dials however are switched by means of switches or similar means together with the components which enable the measurement to be carried out.

A further improvement of the arrangement according to the invention permits a considerable extension of the range of applications for the highest count rates in those ranges in which the pulse count given off with a useful pulse height delivered by the counter tube (for example saturation of a counter tube detector), which pulse count is limited by the natural or technical properties of the detector used, nearing or overshooting its maximum, the detector conducting for short periods only in a regular sequence. This can happen, for example, by modulating the working D.C. voltage of the detector with a pulse sequence, or by pulse operating the detector. If, in doing this, the pulse sequence frequency is made approximately equivalent to the reciprocal of the natural dead time of the detector, and the width of a high voltage pulse narrower than that of the detector pulse, as is the case with a low radiation level, the result is not only a range extension in the order of factor 10 to 200 but also a further desirable effect becomes apparent. A decrease in the indication because of a decreased indicated pulse count with an increasing radiation level can no longer take place, for with an expedient circuit arrangement following the detector the maximum indicated average pulse sequence frequency is that of the high voltage generator.

With the arrangement according to the invention an extremely expedient arrangement of the power supply for the detectors is provided, which fulfils several tasks in the individual ranges using the same components. This is evident especially from the following descriptions of versions of the arrangement according to the invention and elaborations of the same, which explain the operation of arrangements according to the invention by means of two block diagram drawings and a detailed circuit diagram drawing of a constructed apparatus.

Figure 1:
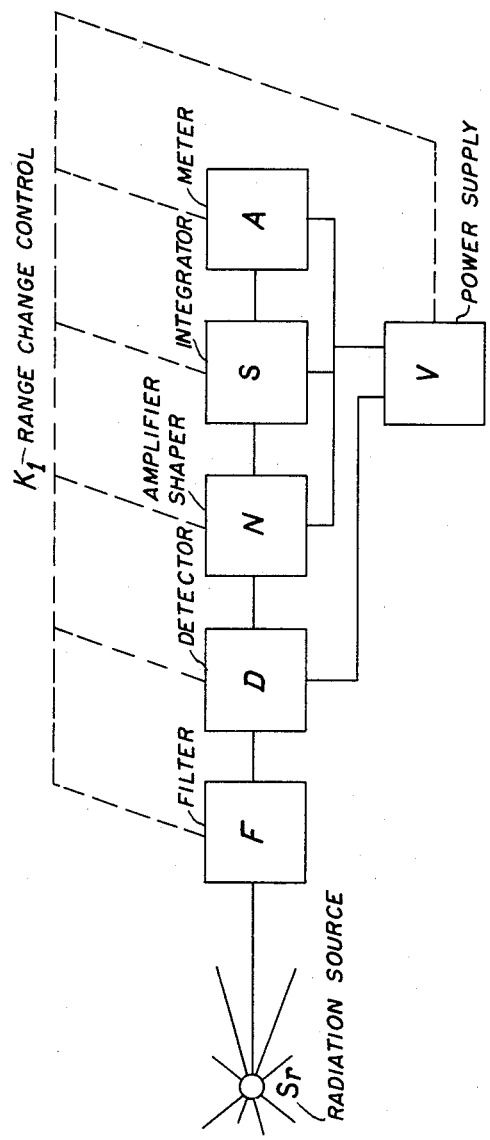
FIG. 1 is a block diagram of an arrangement according to the invention, whose circuit diagram is roughly equivalent to that of FIG. 3 and which is described later.

Referring to the drawings, the nuclear radiation emanating from a radiation source Sr, which radiation contains $\alpha$, $\beta$ and $\gamma$ radiation, arrives at a filter arrangement F. This contains, for example, filter discs of aluminium, copper, or similar material, placed in front of or behind an opening in the apparatus casing. It is advisable to seal off this opening against moisture penetration into the interior of the apparatus, by means of 10 to 20$\mu$ thick plastic foil. These filter discs can be coupled mechanically very advantageously to the range change mechanism.

They can, however, also be activated by means of an additional mechanical device, for example, by placing a filter in front the α radiation can be absorbed, so that only β and γ radiation reach the detector, and so on. In addition, a calibration preparation agent, similar in form to a filter, can be suitably placed in front of or behind the filters in front of the detector window, which preparation contains a minute amount, for example 1 μc., of a radioactive β substance (e.g. $Sr^{90}$), for detector calibration purposes or as an operating check.

As detector D it is best to use a window counter tube operating in the Geiger-Muller region and if possible filled with halogen. For certain tasks, however, other pulse delivering radiation detectors can be used to advantage, for example, scintillation types in conjunction with secondary electron multipliers. The detector pulses then pass through an amplifier and shaper stage N, which for best results consists of a monostable multivibrator, the pulse width of which is switched with the range switch, corresponding to the measuring range. However, other pulse amplifier/shapers can be employed, for example monostable blocking oscillators. The standardized and suitably shaped pulse is then, after integration and the determining of the maximum average pulse sequence frequency for each range, used in A to obtain a reading on a moving coil meter. For this purpose, a special dial is provided for each range, which is coupled to the range switch. The individual dials can be grouped together, according to the type of drum, band or sliding dials.

The power supply V with the HT oscillator has the following operating possibilities, arranged for example as a blocking oscillator, which possibilities are effected by switching the components which determine the operation in or out, whereby the switching process is coupled with the range switch. In the ranges with a very low radiation level the blocking oscillator oscillates at a very low pulse sequence frequency, for example 0.1 to 10 c./s., and charges up a reservoir condenser of, for example, 0.005 μf., to the peak pulse voltage of, for example, 500 v. The energy stored up in the condenser allows the detector in the case being described to oscillate at an average pulse sequence of 100 pulses per second, of which with the assumed five-fold range overload capacity only 20 pulses per second are required up to the decrease in the indication, in order to achieve a full scale deflection on the meter. With this method of operation, the HT oscillator has a very minute consumption of approximately 1 ma. The HT oscillator is correspondingly designed in ranges which possess a full scale deflection of the measurement meter, for example, at 200 pulses per second and 2000 pulses per second. This can be effected, for example, by raising the blocking oscillator frequency step by step. It can, however, also be effected by means of the pulses employed by the detector and fed back to the blocking oscillator, proportional to the energy used. This method then enables continuous variation. As in the case described the counter tube saturation, with a dead time of 100 μsec., sets in at approx. 2500 pulses per second, corresponding to a count rate of approx. 0.1 r./h., the pulse sequence frequency of the blocking oscillator is raised in the following measurement range to approx. 10 kc./s. At the same time, the power supply condenser is reduced in value to approx. 20 pf., so that the counter tube is then only operative for the duration of a single blocking oscillator pulse (approx. 15 μsec.). This results in the measurement range being increased to 50 r./h., which value corresponds to an average sequence freqency of approx. 9 kc./s. for the indication.

The functioning of all the properties of the arrangement according to the invention is made effective on all measurement ranges by the coupled change-over control $K_1$ of all the components determining functions.

Figure 2:
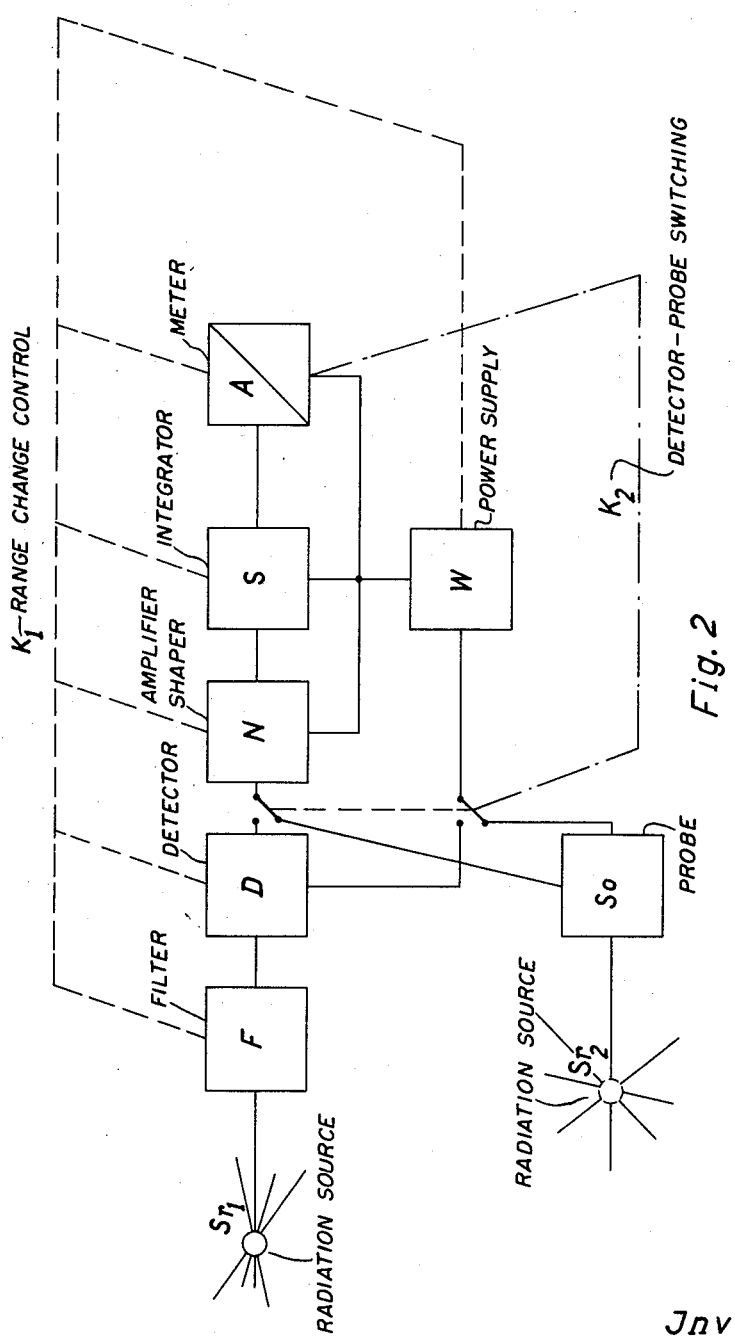
FIG. 2 is the block diagram to the circuit diagram of FIG. 3 and is a further elaboration of the arrangement of FIG. 1.
Figure 3:
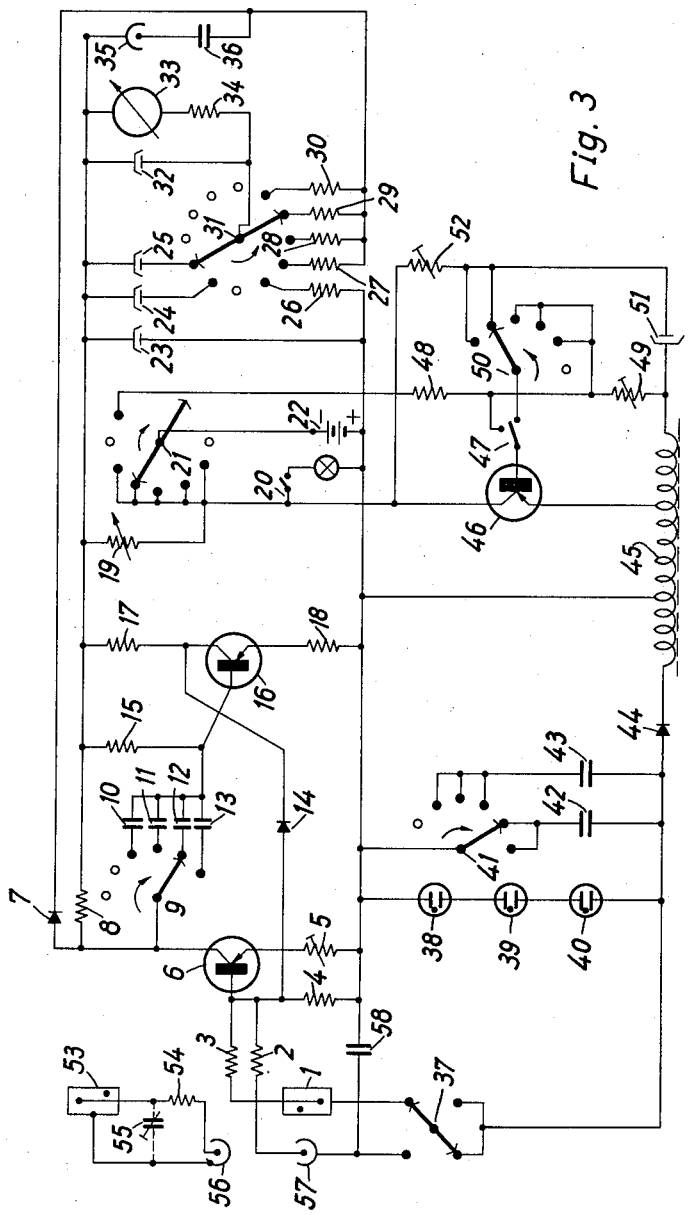

In the block diagram FIG. 2 and the relative circuit diagram according to FIG. 3, a further arrangement according to the invention is represented. As symbols familiar to every technician are used in the circuit diagram, it is not necessary to describe in more detail those parts of the circuit which are known to the technician.

As opposed to FIG. 1, FIGS. 2 and 3 show a further detector designed as a probe. It can derive its power preferably from the power supply unit in that part of the circuit now described as the basic apparatus, which corresponds to FIG. 1. The processing in the basic apparatus of the pulses delivered by the probe is carried out in the same way. The probe measurement indication is also effected via the measuring mechanism in the basic apparatus. For this, it is best to form the individual dial segments of the revolving dial, which appears under the dial window, as a double dial corresponding to the various calibrations of the basic apparatus. These segments are generally numbered differently and are, for example, in different colours. For this, a dial cover is also provided, which is activated by the change-over control $K_2$ and which, coupled with the change-over control basic apparatus-probe, releases only the dial corresponding to the detector in circuit. An arrangement according to FIG. 2 reveals substantial and many-sided possibilities of extending the range of applications for the object of the invention, for example by using several detectors connected in parallel as a probe. In addition, a further elaboration provides for a combination of the coupling designated $K_1$ and $K_2$, which is achieved by known mechanical means and which results in a further simplification in operation. A relay can also be used to great advantage for the change-over operation designated $K_2$.

If three or more switch positions are provided for the change-over control $K_2$, above all with rather larger portable apparatuses, and if dials corresponding to the number of switch positions $K_2$ are employed for each dial segment, the result achieved is one of further advantages and possibilities.

FIG. 3 represents the circuit diagram of an apparatus designed according to the invention. The switch segments 9, 21, 31, 41 and 50 are coupled by means of a drive with the revolving dial of the indicator meter 33 and are operated by means of a knob in such a way that in the OFF position (battery switched off) a plain dial with the inscription "OFF" appears in the indicator window. At the same time, the mechanical zeroing of the meter 33 can be adjusted in this position. On switching the range switch to the next position, a dial with an adjustment mark and the inscription "battery voltage check" appears underneath the indicator window. In this position the indicator meter 33 with its series resistors 34 and 26 measures the operating voltage of the battery 22 which lies via the adjustment resistor 19 across the pulse former designed with the transistors 6 and 16 as a monostable multivibrator. At the same time the battery voltage lies across the HT oscillator with the transistor 46. This receives a small negative voltage on its base via the voltage divider 48, 49, so that it can begin to oscillate. The pulses generated in connection with the transformer 45 have a peak voltage across the secondary winding of 500 to 800 v. and are negative. After passing through the silicon diode 44 which has a high resistance in the positive direction, these pulses are brought to a constant amplitude by means of the neon stabilizers 38, 39, 40. As the reservoir and shaping condenser 43, which is placed parallel to the stabilizers in switch positions 2, 3, and 4 by means of the switch segment 41, has a value of only 10 to 30 pf. approx., only a small D.C. component builds up on 43, so that almost pure pulse voltage lies across the counter tube switch 37. The pulse oscillator has a pulse sequence frequency of approx. 10 kc./s., which can be adjusted with the control 49. In doing so, the pulsing ratio which results from the properties of the system is approx. 1:6 for a pulse width of approx. 15 μsec. The counter tube 1 has a sensitive volume of approx. 0.5 $cm.^3$ and in the circuit arrangement has a recovery time of approx. 80 μsec. For purely D.C. operation in the circuit arrangement the maximum deliverable pulse count is around 12 to 14 kc./s., corresponding to a count rate of approx. 80 r./h. with Ra gamma radiation. With this, the measuring range indicated from 10 to 80 r./h. is compressed into the last quarter of the dial on the indicating meter. With the pulse operated counter tube used, full scale deflection of the dial is around 500 r./h., and the dial is considerably more linear. The counter tube pulses pass over the resistor 3 to the base of the silicon transistor 6. The resistor 4 effects an additional input attenuation and discrimination of the input pulses in such away that only pulses with a certain minimum height unblock the monostable multivibrator with the components 4, 5, 6, 7, 8, 9, 10, 11, 12, 13, 14, 15, 16, 17, 18. The condensers 10, 11, 12, 13, which determine the width of the output pulses, are switched in in the individual ranges by means of the switch segment 9. The negative feedback resistor 5 enables variations arising in production which are caused by deviations in tolerance of the components, above all in the tolerance of 1, 6, 14, 16, to be reduced considerably. By means of this and by the use of silicon transistors, a high degree of constancy and measurement accuracy is attained over a large temperature range. The pulses which appear at the output resistor 8 positive, amplified and standardised pass through the diode 7 and are integrated, in accordance with the individual ranges, in the networks made up by the resistors 27, 28, 29 and 30 and the condensers 24, 25, 32, which are operated by the switch segment 31. The voltages which build up across 24, 25, 32, are measured with the indicator system 34, 33, and are calibrated on the indivdual dials corresponding to the ranges as a gauge of the count rate on the counter tube 1.

If the detector selector switch 37 is correspondingly operated, the EHT lies via the plug-in connection 56, 57, and a cable which is not shown across the detector system 53, 54, 55, which is designed as a probe. At the same time, the reservoir condenser 58, with a value of approx. 3000 to 5000 pf. is placed parallel to the stabilizers. In this way the counter tube 53, which has for example an effective volume of 6 cm.$^3$, receives the D.C. voltage building up across 58 in the switch positions 2, 3, 4 as well. The pulses given off by it pass over the resistor 2 to the input of the shaper stage and are used after further processing, as already described, to operate the indicating meter. For this purpose each dial range section has, in addition to a dial for the counter tube 1, a differently coloured and numbered dial for the counter tube 53, whereby the dial not required can be concealed with a cover on operating the switch 37.

In the switch positions 5, 6 the power supply device operates in another way: In this case the blocking oscillator oscillates at a fixed frequency of approx. 10 c./s., determined by the condenser 51 and the resistor 52. The EHT pulses charge up the condenser 42, which has a value of 5000 pf., to the voltage resulting from the stabilizers 38, 39, 40. In this case the counter tube 1 also operates as a normal D.C. operated Geiger-Muller counter tube.

As the average consumption of the blocking oscillator in the ranges 2, 3, 4 is approx. 14 to 16 ma. from a 2.5 v. battery, this type of operation represents a considerable advantage in the ranges 5, 6 in which the average consumption is 1 ma, with the same type of operation for the counter tube. As a result of the small charge and the large reservoir condenser, however, the stabilizers flicker in operation with 5 to 100 light flashes a minute. As the stabilizers are also used for the dial illumination, the operating condition of the ranges 2, 3, 4 is also made possible on the ranges 5 and 6, by pressing a switch 47 designed as a pushbutton, whereby an adequate and steady illumination is achieved. For special requirements, switch 20 can also be operated with the same pushbutton, whereby a normal bulb can be switched in, but with a higher consumption of course.

By suitable dimensioning of the individual components which determine the ranges, the following results can be obtained with an arrangement according to the invention, as already described:

| Switch position | Range, Counter tube 1 | Range, Counter tube 53 | Total Consumption |
| --- | --- | --- | --- |
| 3 | 1 to 600 r./h | 10 to 500 r./h | approx. 15 ma. |
| 4 | 0.1 to 6 r./h | 1 to 50 mr./h | approx. 15 ma. |
| 5 | 1 to 100 mr./h | 0.1 to 5 mr./h | approx. 2 ma. |
| 6 | 0.1 to 10 mr./h | 5 to 500 µr./h | approx. 2 ma. |

With a counter tube with an effective volume of 6 cm.$^3$ used as a built-in counter tube in a similarly dimensioned circuit, the following results were obtained:

| Switch position | Range | Consumption |
| --- | --- | --- |
| 3 | 0.5 to 100 r./h | 12 ma. |
| 4 | 10 to 1,000 mr./h | 12 ma. |
| 5 | 1 to 50 mr./h | 2 ma. |
| 6 | 5 to 500 µr./h | 2 ma. |

As both the counter tubes used were of the same type, as built into several commercially obtainable apparatuses with one or two counter tubes employed at the same time to achieve sensitive measurement ranges, but with which only 0.5 to 500 mr./h. can be measured, then the advantage of the arrangement according to the invention is obvious; because apart from other considerable advantages resulting from the plain readability, simple operation and high degree of accuracy, the range attainable with one counter tube or a similar detector is enlarged more than 4 times to the power of ten.

Further, the arrangement described by means of FIGS. 1, 2, 3 according to the invention can be accommodated compactly and with complete assurance of reliable operation in an extremely small space: A pocket apparatus according to the invention had a size of approx. 14 x 9.5 x 4.3 cm. and a weight, ready for use, of approx. 500 gr.

Apparatuses according to the invention are not limited to the application examples described above or to similar examples. They can also be used with success for other tasks, for example with arrangements which, with the help of pulse delivering detectors, have to fulfil other measurement tasks, for example in the field of RF work or for the indication of electromagnetic radiation.

I claim:

1. Apparatus for indicating and measuring nuclear radiation, comprising a pulse delivering counter tube detector, an impulse generator comprising an oscillator connected to power said detector, dial indicator means for different individual pulse ranges, and switch devices connected to the oscillator and detector and having a switch position wherein, in the ranges with low pulse counts, such low pulse counts are extended in length and the impulse generator operates at low frequency, and having a different switch position wherein, in the ranges with higher pulse counts the individual pulse widths are reduced without decreasing pulse amplitude and the frequency of the impulse generator is increased, whereby in the ranges in which the final pulse count is delivered, limited by the characteristics of the detector which conducts in regular sequence for short periods only, such final pulses provide the respective indicator readings.

2. An arrangement according to claim 1, including neon stabilizers for the impulse generator, which stabilizers are also positioned for the dial indicator means illumination, whereby on switching on, they allow a satisfactory and steady dial illumination, even with a low consumption of the HT oscillator which can under certain conditions cause the stabilizers to give a flickering light.

3. In combination, a radiation counter tube having a counting rate range variable with the incident radiation intensity, indicator means for indicating the counting rate, a recurrent impulse voltage source energizing the counter tube, counting range control switch means operative in one position to effect high recurrence pulse generation for operating the counter tube at upper counting range rates, and operative in another position to effect low recurrence pulse generation for operating the counter tube at lower counting range rates.

4. The apparatus defined in claim 3, and means in the voltage source operable to increase and decrease the effective direct-voltage impulse duration and, cooperatively therewith, to decrease and increase the repetition frequency of the impulses.

5. The apparatus defined in claim 3, wherein the voltage source comprises a generator of recurrent discrete impulses of a magnitude subject to variation, means in the output thereof limiting the magnitude of all such impulses at a predetermined value, and means operable at will to extend the duration of such impulses by a selected amount and simultaneously to decrease the frequency thereof by a related amount.

6. The apparatus defined in claim 5, wherein the means to extend the duration comprises variable storage capacitance means connected across the output.

7. The apparatus defined in claim 3, wherein the voltage source comprises a generator of recurrent discrete impulses of a magnitude subject to variation, means in the output thereof limiting the magnitude of all such impulses at a predetermined value, said latter means comprising at least one gaseous discharge tube connected across the voltage source output, and means operable at will to extend the duration of such impulses by a selected amount and simultaneously to decrease the frequency thereof by a related amount.

8. The apparatus defined in claim 3, wherein the indicator means comprises a monostable trigger circuit connected to the counter tube to be triggered thereby, an integrating circuit in the output of said trigger circuit, and a meter connected to be energized by said trigger circuit to indicate the average frequency of conduction impulses in the counter.

9. Apparatus for indicating and measuring nuclear radiation, comprising, a counter tube operable to conduct an impulse of current under an applied voltage when rendered conductive by a radiation impulse incident on such tube, a voltage source having an output connected across said tube and operable to apply thereto direct-voltage impulses of a repetition frequency which can be varied at will, said source also including means to vary the effective duration of the applied impulses inversely in relation to the frequency thereof, and indicator means connected to the tube to be operated by the impulses of current therein, said indicator means including an integrating device and means responsive to the output of said device.

10. Apparatus for indicating and measuring nuclear radiation, comprising, a source of direct-voltage impulses, including means operable to vary the frequency of said impulses and means to cary the duration thereof, a radiant-energy-sensitive conductive device connected to said source, a monostable trigger circuit responsively connected in circuit with said device and said source and operable to produce a standardized output pulse responsively to an impulse of current in said device, integrator means operable to average the output of said trigger circuit, and indicator means energized by said integrator means.

11. Apparatus for indicating and measuring nuclear radiation, comprising, a counter tube operable to conduct an impulse of current under an applied voltage when rendered conductive by a radiation impulse incident on such tube, a voltage source having an output connected across said tube and operable to apply thereto direct voltage impulses of a repetition frequency which can be varied at will, said source also including means to vary the effective duration of the applied impulses inversely in relation to the frequency thereof, and indicator means connected to the tube to be operated by the impulses of current therein.

References Cited in the file of this patent

UNITED STATES PATENTS

| | | |
|---|---|---|
| 2,617,043 | Hepp | Nov. 4, 1952 |
| 2,682,001 | Duffy | June 22, 1954 |
| 2,752,508 | Zito | June 26, 1956 |
| 2,838,680 | Bender et al. | June 10, 1958 |
| 2,876,360 | Victoreen | Mar. 3, 1959 |
| 2,917,632 | Anton | Dec. 15, 1959 |
| 2,948,812 | Quinn | Aug. 9, 1960 |
| 2,983,818 | Constable | May 9, 1961 |